United States Patent
Saito

(10) Patent No.: US 7,762,671 B2
(45) Date of Patent: Jul. 27, 2010

(54) PROJECTOR APPARATUS, DISPLAY OUTPUT METHOD AND DISPLAY OUTPUT PROGRAM

(75) Inventor: Takashi Saito, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 703 days.

(21) Appl. No.: 11/250,585

(22) Filed: Oct. 14, 2005

(65) Prior Publication Data
US 2006/0082733 A1 Apr. 20, 2006

(30) Foreign Application Priority Data
Oct. 19, 2004 (JP) .............................. 2004-304285

(51) Int. Cl.
*G03B 21/14* (2006.01)
(52) U.S. Cl. .................... 353/42; 353/21; 353/121
(58) Field of Classification Search ................ 353/42, 353/28, 21, 121, 122; 348/164, 14.09, 14.03; 345/158, 207, 690; 382/163–167, 256, 266, 382/274, 275
See application file for complete search history.

(56) References Cited

U.S. PATENT DOCUMENTS

| | | | |
|---|---|---|---|
| 5,793,948 A | | 8/1998 | Asahi et al. |
| 6,879,326 B1 * | | 4/2005 | Herman ...................... 345/589 |
| 6,999,061 B2 * | | 2/2006 | Hara et al. ................... 345/157 |
| 7,062,134 B2 * | | 6/2006 | Veligdan et al. ............. 385/120 |
| 7,170,531 B2 * | | 1/2007 | Itoh et al. .................... 345/629 |
| 7,358,962 B2 * | | 4/2008 | Dehlin et al. ................ 345/173 |
| 2003/0112415 A1 * | | 6/2003 | Hsu et al. ...................... 353/42 |
| 2004/0075820 A1 * | | 4/2004 | Chu et al. .................... 353/122 |
| 2004/0085522 A1 * | | 5/2004 | Honig et al. ................. 353/121 |
| 2005/0195221 A1 * | | 9/2005 | Berger et al. ................ 345/660 |
| 2005/0206627 A1 * | | 9/2005 | Simmons ..................... 345/179 |
| 2008/0231819 A1 * | | 9/2008 | Chang et al. ................ 353/121 |

FOREIGN PATENT DOCUMENTS

| | | |
|---|---|---|
| JP | 8-153022 A | 6/1996 |
| JP | 11-144026 | 5/1999 |
| JP | 2000-241190 A | 9/2000 |
| JP | 2003-279892 A | 10/2003 |
| JP | 2004-274283 A | 9/2004 |

OTHER PUBLICATIONS

Japanese Office Action dated Apr. 27, 2010 and English translation thereof in counterpart Japanese Application No. 2004-304285.

* cited by examiner

*Primary Examiner*—William C Dowling
(74) *Attorney, Agent, or Firm*—Frishauf, Holtz, Goodman & Chick, P.C.

(57) ABSTRACT

To provide a projector apparatus capable of giving attention stably and clearly to a specific area within an image projected and displayed on a screen, and to provide a display output method and display output program of the apparatus. For that purpose, the projector apparatus for projecting and displaying an image on a screen comprises an input section which accepts an indication of a specific area within the projected and displayed image; and an image processor that subjects a specific area and/or an other area within the image to image processing for emphasizing the specific area, the other area being an area other than the specific area in the image.

14 Claims, 10 Drawing Sheets

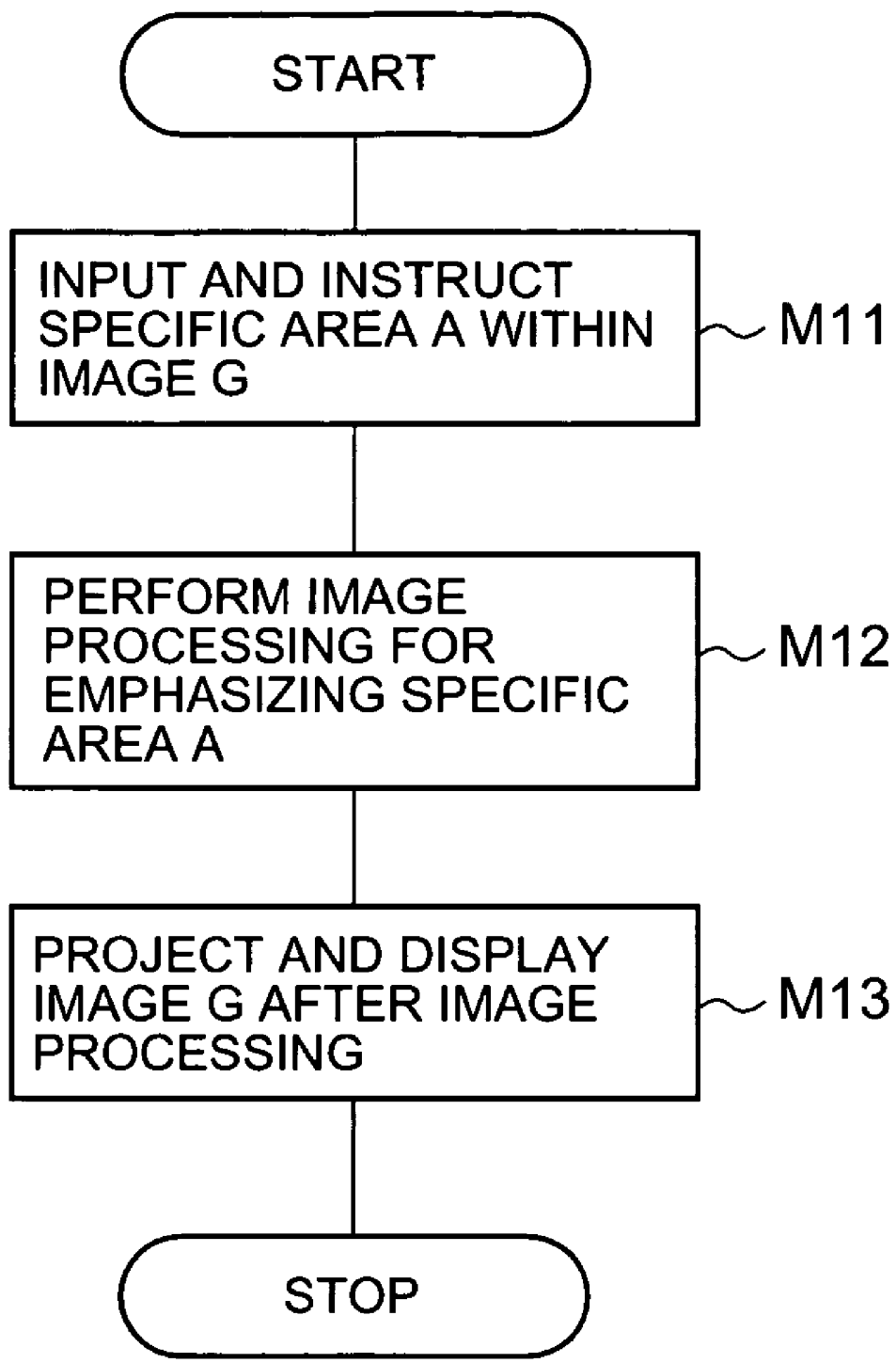

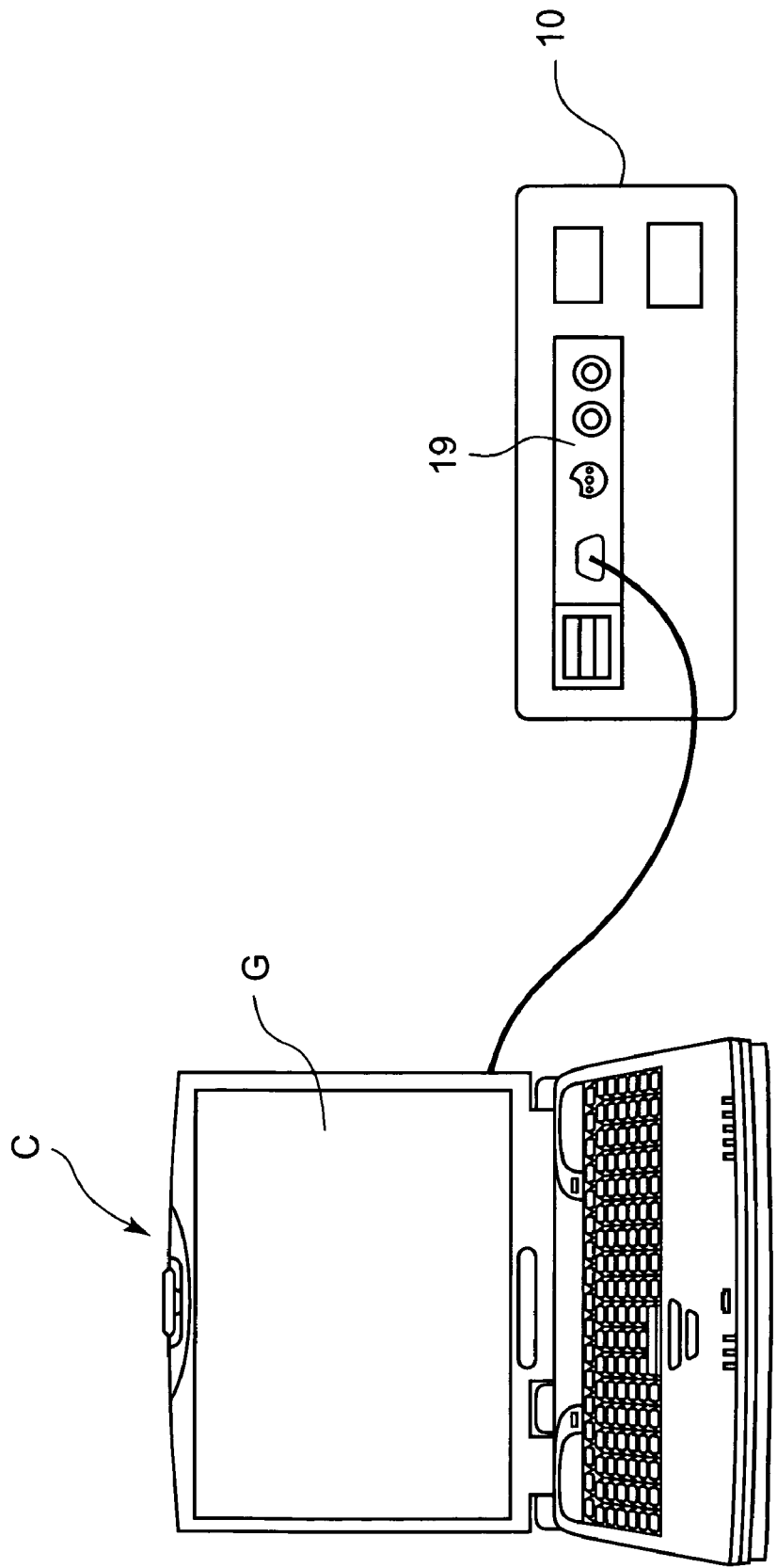

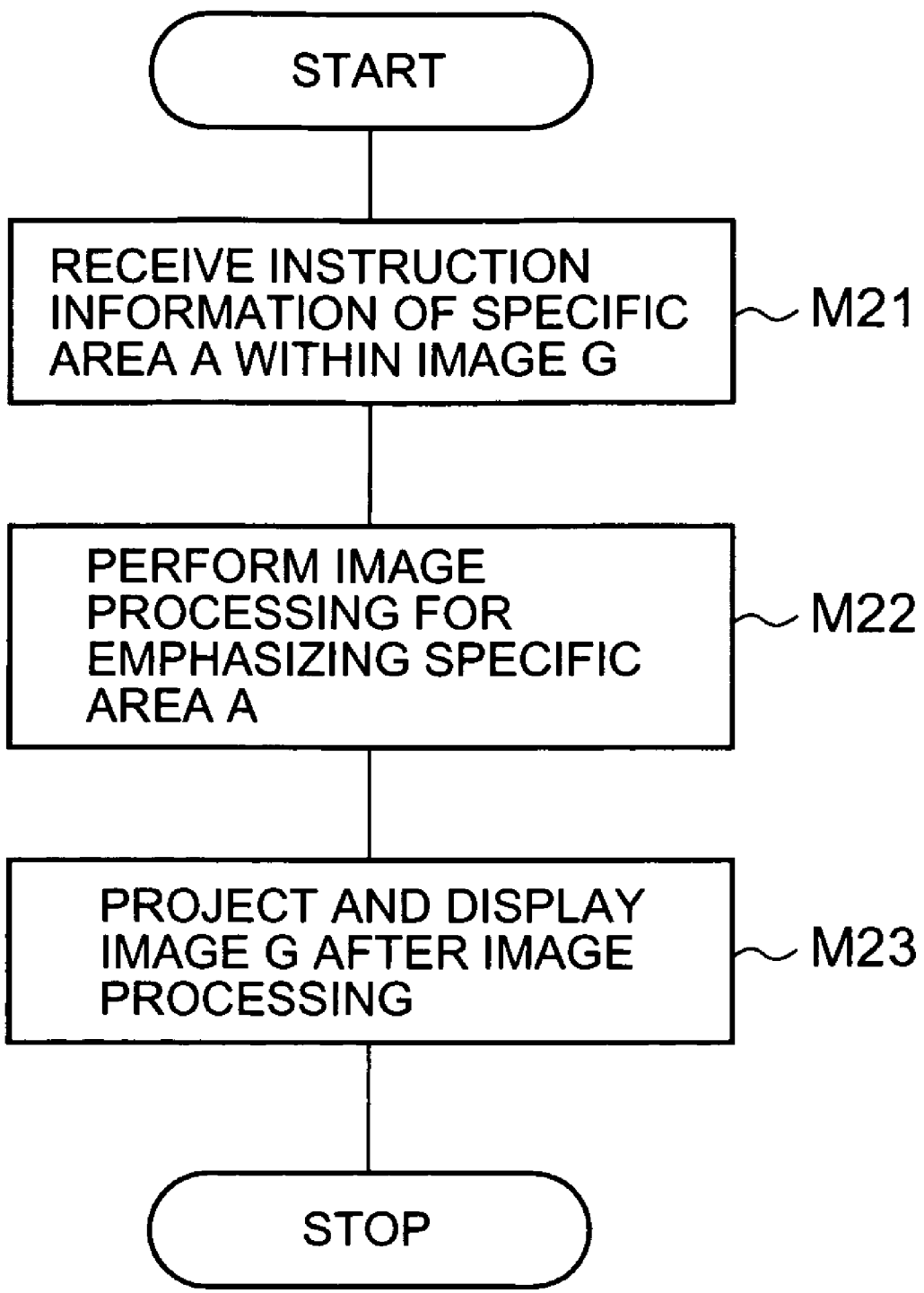

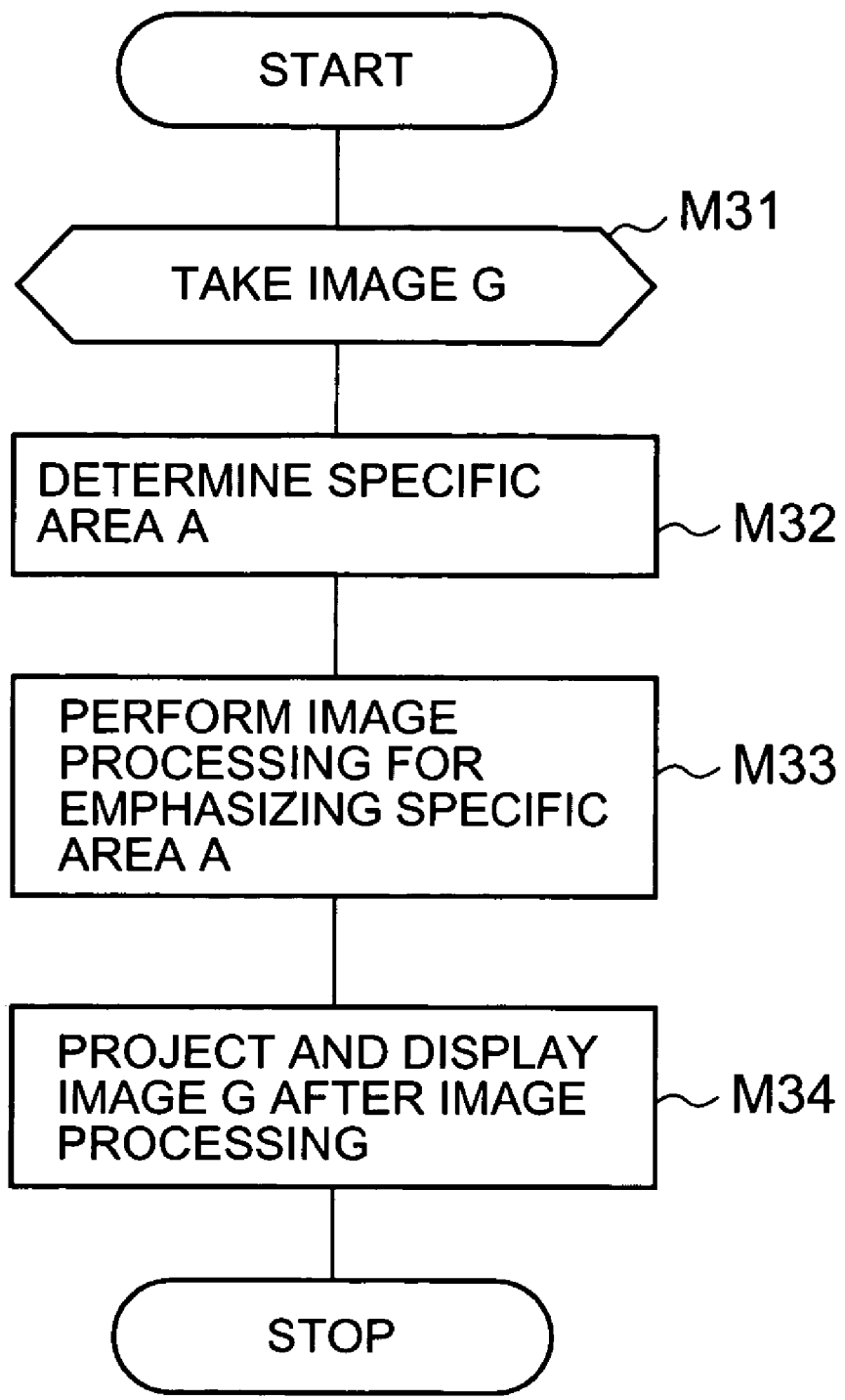

PROJECTOR APPARATUS, DISPLAY OUTPUT METHOD AND DISPLAY OUTPUT PROGRAM

BACKGROUND OF THE INVENTION

1. Field of the Invention

The present invention relates to a projector apparatus for projecting and displaying an image on a screen. The present invention also relates to a display output method and display output program of the projector apparatus.

2. Description of Related Art

In a presentation using an image, numerous projector apparatuses which project an image on a screen are used. Nowadays, technologies of forming multi-functional projector apparatuses are making progress. For example, there is proposed a projector apparatus having a monitor camera that takes an image projected on a screen to detect a trapezoidal distortion on projection screens for performing screen position adjustment.

SUMMARY OF THE INVENTION

According to one aspect of the invention, a projector apparatus for projecting and displaying an image on a screen, comprises: an input section which accepts an indication of a specific area within the projected and displayed image; and an image processor which subjects a specific area and/or an other areas within the image to image processing for emphasizing the specific area, the other area being an area other than the specific area in the image.

Preferably, the input section comprises: a connecting section which connects to an external image output device; and a receiver which receives area indication information to indicate a specific area within an image input from the external image output device through the connecting section.

According to another aspect of the invention, a projector apparatus for projecting and displaying an image on a screen, comprises: a photographing section which takes an image projected and displayed on the screen; an area specifying section which determines a specific area within the image from position information of a point indicated using an indicating tool on the image projected and displayed on the screen; and an image processor that subjects a specific area and/or an other area within the image to image processing for emphasizing the specific area, the other area being an area other than the specific area in the image.

According to another aspect of the invention, a display output method of a projector apparatus for projecting and displaying an image on a screen, comprises: an input step which accepts an indication of a specific area within the projected and displayed image; and an image processing step which subjects a specific area and/or an other area within the image to image processing for emphasizing the specific area, the other area being an area other than the specific area in the image.

Preferably the input step comprises: a reception step which receives area indication information indicating a specific area within an image input from an external image output device.

According to another aspect of the invention, a display output method of a projector apparatus for projecting and displaying an image on a screen, comprises: a photographing step which takes an image projected and displayed on the screen; an area specifying step which determines the specific area within the image based on position information of a point indicated by using an indicating tool on the image projected and displayed on the screen; and an image processing step that subjects a specific area and/or the other areas within the image to image processing for emphasizing the specific area.

According to another aspect of the invention, a display output program for a computer which controls a projector apparatus used for projecting and displaying an image on a screen, comprises the functions of: an input function which accepts an indication of a specific area within the projected and displayed image; and an image processing function which subjects a specific area and/or an other area within the image to image processing for emphasizing the specific area, the other area being an area other than the specific area in the image.

Preferably, the input function comprises a reception function which receives area indication information indicating a specific area within an image input from an external image output device.

According to another aspect of the invention, a display output program for a computer which controls a projector apparatus used for projecting and displaying an image on a screen comprises the functions of: a photographing function that takes the image projected and displayed on the screen; an area specifying function which determines a specific area within the image based on position information of a point indicated by using an indicating tool on the image projected and displayed on the screen; and an image processing function that subjects a specific area and/or the other areas within the image to image processing for emphasizing the specific area.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein;

FIG. 4 is a flowchart showing a flow of highlight processing according to the first embodiment;

FIG. 6 shows a relation between a projector apparatus and a terminal device according to the second embodiment;

FIG. 7 is a flowchart showing a flow of highlight processing according to the second embodiment;

FIG. 10 is a flowchart showing a flow of highlight processing according to the second embodiment.

DETAILED DESCRIPTION OF PREFERRED EMBODIMENTS

An embodiment in which the present invention is applied to a projector apparatus 10 will be described with reference to the drawings. However, the scope of the present invention is not limited to the example shown in figures.

First Embodiment

Figure 1A:
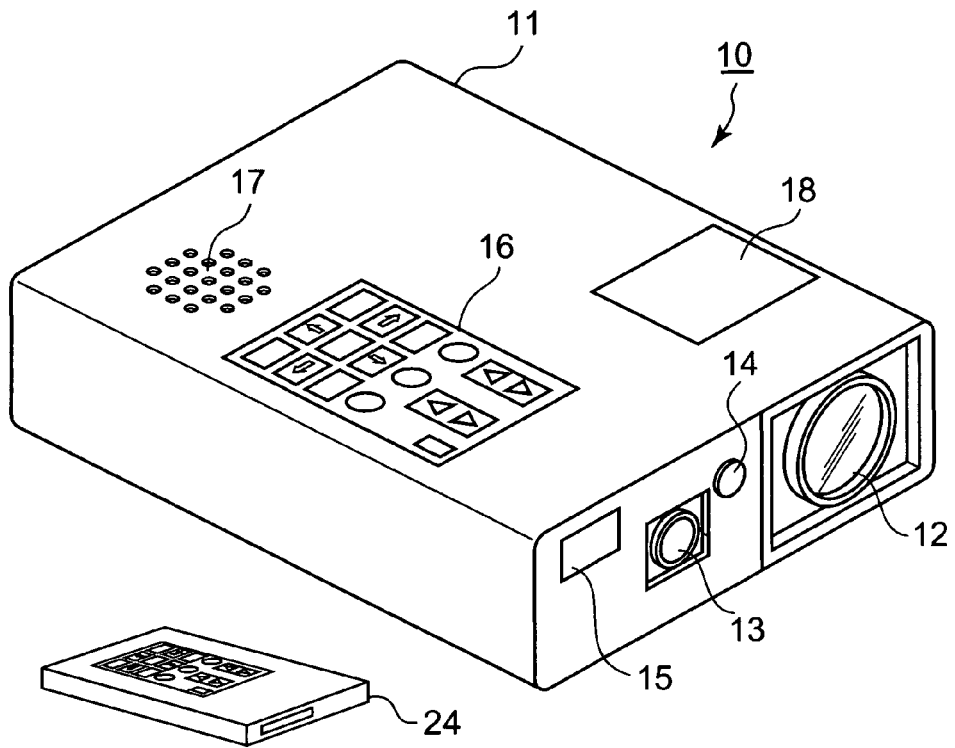
FIGS. 1A and 1B show an external construction of a projector apparatus.

FIG. 1 shows an external construction of a projector apparatus 10 and remote controller 24 according to the first embodiment. As shown in FIG. 1A, a projection lens 12, a photographing lens 13, an Ir transmitter 14 and an Ir receiver 15 are provided on a front surface of a rectangular solid-shaped body casing 11.

The projector lens 12 projects on a screen an optical image formed using a spatial optical modulation element such as a micromirror element described later. The projector lens 12 used herein is a lens capable of arbitrarily changing separately a focus position and a zoom position (projection field angle) within a predetermined range.

The photographing lens 13 has an optical lens system capable of automatic focusing and zoom, which has at least the same photographing viewing angle as that of the projector lens 12. On an image pickup plane of a CCD 40 as a solid-state image sensing device, the lens 13 forms an optical image containing a projector image of the projector lens 12.

The Ir transmitter 14 irradiates Infrared light to a center in a projecting direction of the projector lens 12.

The Ir receiver 15 receives reflected light generated when Infrared light irradiated by the Ir transmitter 14 is reflected from a screen as a projecting object, or Infrared light having superimposed thereon a key operation signal from a remote controller 24.

In the present embodiment, the Ir transmitter 14 and the Ir receiver 15 perform automatic focusing processing in an active system using Infrared light as described later.

Further, a main key 16 and a speaker 17 are provided on an upper surface of the body casing 11.

The main key 16 comprises a key for performing on/off of a power or various operations, and an indicator such as an LED (Light Emitting Diode) for displaying the key operation state using on/off and a lighted color.

The speaker 17 expands and outputs a voice in reproducing presentation contents or recorded animations.

Figure 1B:
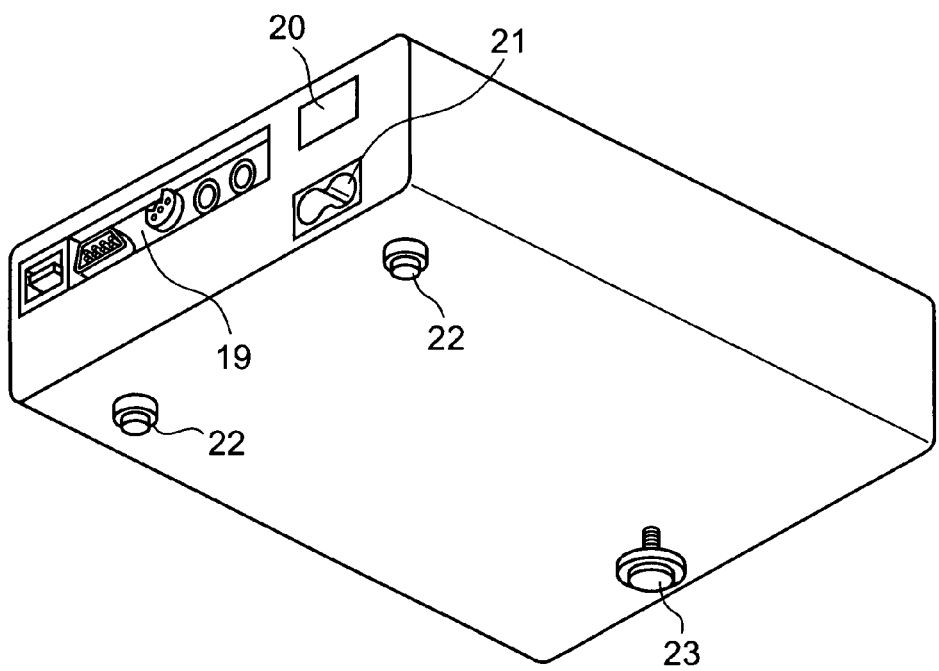

A cover 18 has a memory card loading section in the inside thereof, and opens and closes in loading a memory card Further, as shown in FIG. 1B, an input/output connector section 19, an Ir receiver 20 and an AC adapter connection section 21 are provided on a rear surface of the body casing 11.

The input/output connector section 19 has, for example, a USB (Universal Serial Bus) terminal for image input and output, a Mini D-SUB terminal, S terminal and RCA terminal for image input, and a stereo mini-terminal for audio input, which are used for connecting to an external device such as a Personal Computer (hereinafter, referred to as a PC).

In the same manner as in the Ir receiver 15, the Ir receiver 20 receives Infrared light having superimposed thereon a key operation signal from a remote controller 24.

The AC adapter connection section 21 connects a cable from an AC adapter as a power supply.

In addition, on a bottom surface of the casing 11, a pair of fixed leg sections 22 and 22 are attached on a back surface side as well as a height-adjustable adjustment leg section 23 is attached on a front surface side.

The section 23 adjusts correctly a vertical direction component in the projection direction of the projector lens 12, namely, an elevation angle when being manually operated in its screw rotating position.

Figure 2:
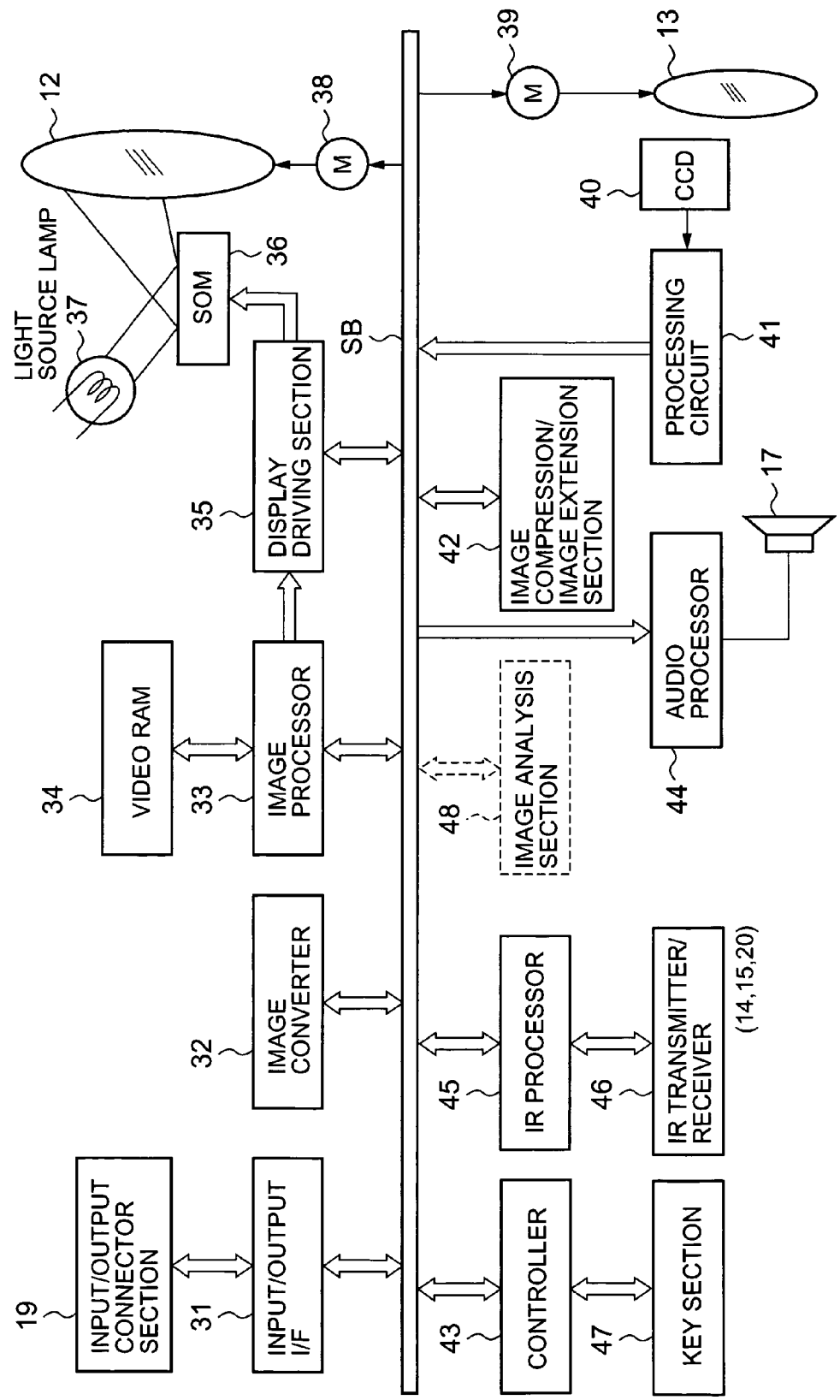
FIG. 2 is a block diagram showing a functional construction of a projector apparatus.

Next, a functional construction of the projector apparatus 10 will be described with reference to FIG. 2. The projector apparatus 10 comprises an input/output I/F 31, an image converter 32, an image processor 33, a video RAM (Random Access Memory) 34, a display driving section 35, a spatial optical modulation element (SOM) 36, a light source lamp 37, a lens motor 38, a lens motor 39, a CCD (Charge Coupled Devices) 40, a processing circuit 41, an image compression/image extension section 42, a controller 43, an audio processor 44, an Ir processor 45, an Ir transmitter/receiver 46 and a key section 47.

In the figure, an image signal of various standards inputted from the input/output connector section 19 is standardized to an image signal having a predetermined format suitable for the display by the image converter 32 through the input/output I/F 31 and a system bus SB and then, is outputted to the image processor 33.

The image processor 33 allows the outputted image signal to be expanded and stored in the video RAM 34. Then, the section 33 allows a video signal to be generated from a memory content of the video RAM 34 and outputs the signals to the display driving section 35. Further, the image processor 33 subjects a part or the whole of the image signals stored in the video RAM 34 to various image processing such as a change of a luminance, a change of a gradation or a synthesis of a predetermined image.

The display driving section 35 displays and drives the SOM 36 at a suitable frame rate, for example, at 30 (frame/second) in response to the transmitted image signals. On this occasion, the spatial optical modulation element 36 is irradiated, for example, with high-luminance white light emitted from the light source lamp 37 such as an extra-high-pressure mercury-vapor lamp. As a result, an optical image is formed by reflected light of the white light, and is projected and displayed on the screen through the projector lens 12.

Incidentally, the projector lens 12 is driven by the lens motor (M) 38 to appropriately move the zoom position and the focus position.

Further, during a photographing mode for taking a projection image, when forming an image on an image pickup plane of the CCD 40 as a solid-state image sensing device arranged on an optical axis of the photographing lens 13 which is driven by the lens motor (M) 39 to move the zoom position and the focus position, an image signal having a corresponding analog value is generated from the CCD 40 and then transmitted to the processing circuit 41.

The processing circuit 41 digitalizes the image signal obtained from the CCD 40 and subjects the digitalized signal to color process processing including picture element interpolation processing and γ correction processing. Then, the circuit 41 generates a luminance signal Y and color-difference signals Cb and Cr each having a digital value and outputs the signals Y, Cb and Cr to the image compression/image extension section 42 through the system bus SB.

The image compression/image extension section 42 data-compresses the luminance signal and color-difference signal by processing such as ADCT or Huffman coding. Further, the section 42 sequentially writes the obtained image data in a memory card which is attachably/detachably loaded as a recording medium of the projector apparatus 10.

The controller 43 comprises a CPU (Central Processing unit), a ROM (Read Only Memory) that fixedly stores an operation program executed in the CPU and a RAM (Random Access Memory) used as a work memory. The controller 43 totally controls the whole operation of the respective circuits.

Further, when a specific area within a projected and displayed image is indicated through the main key 16 or the remote controller 24, the controller 43 controls the image processor 33 to perform image processing for emphasizing the specific area.

To the controller 43, also the audio processor 44 and the Ir processor 45 are connected through the system bus SB.

The audio processor 44 has a sound source circuit for a PCM sound source. The section 44 converts audio data into analog data during a projection mode and a reproduction mode, and drives the speaker 17 to allow it to loudly speak voices and to sound a ringer tone.

The Ir processor 45 is connected to the Ir transmitter/receiver 46 composed of the Ir transmitter 14, the Ir receiver 15 and the Ir receiver 20. When the Ir receiver 15 receives reflected light generated by irradiation of Infrared light in the Ir transmitter 14, the section 45 calculates a distance to a projector object based on a time difference between the irradiation time and the reception time. Alternatively, when the Ir receivers 15 and 20 receive the key operation signal from the remote controller 24, the section 45 performs demodulation processing to generate code information corresponding to the key operation signal and outputs the information to the controller 43.

The key section 47 is composed of the main key 16 and outputs any of the key operation signals to the controller 43.

Figure 3A:
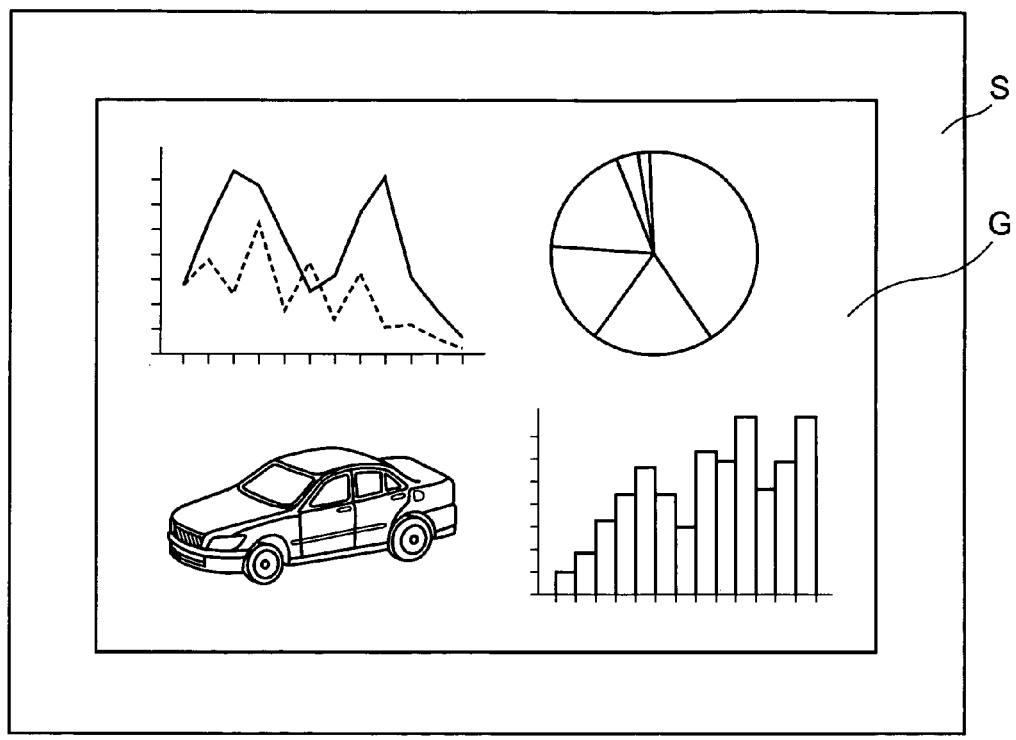
FIG. 3A shows one example of an image projected and displayed on a screen.

Next, a flow of the processing in highlighting a specific area A within an image G projected and displayed by the projector apparatus 10 will be described with reference to FIGS. 3 to 5. On the premise of the processing, the apparatus 10 projects and displays the image G on a screen S, as shown in FIG. 3A.

Figure 3B:
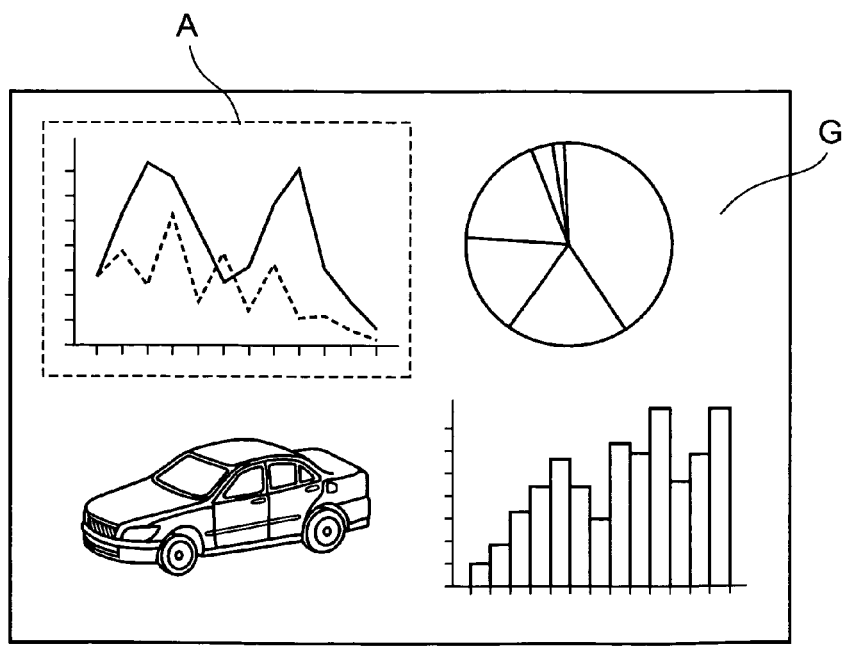
FIG. 3B shows one example of a specific area indicated within an image.

First, within the image G projected and displayed on the screen S, a specific area A to which attention of viewers is required to be given is inputted and indicated by users through keys of the main key 16 or the remote controller 24 (step M11). In FIG. 3B, the specific area A is displayed as an oblong area; however, the present invention is not limited thereto.

Next, by the image processor 33 according to the control of the controller 43, predetermined image processing for highlighting the specific area A within the image G indicated in step M11 is applied to an image signal corresponding to the image G (step M 12).

Figure 5B:
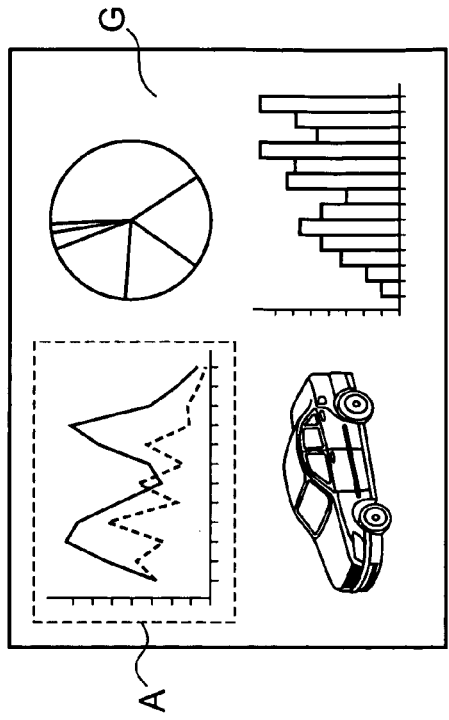
FIG. 5B shows one example of image processing for emphasizing a specific area.
Figure 5D:
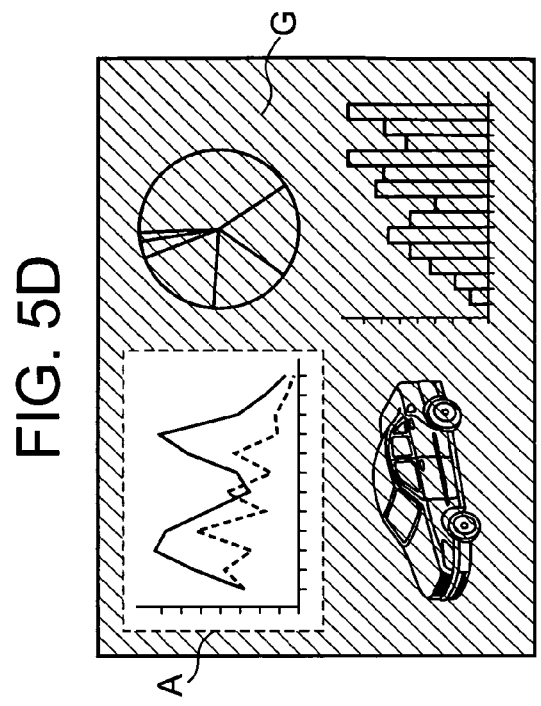
FIG. 5D shows one example of image processing for emphasizing a specific area.
Figure 5A:
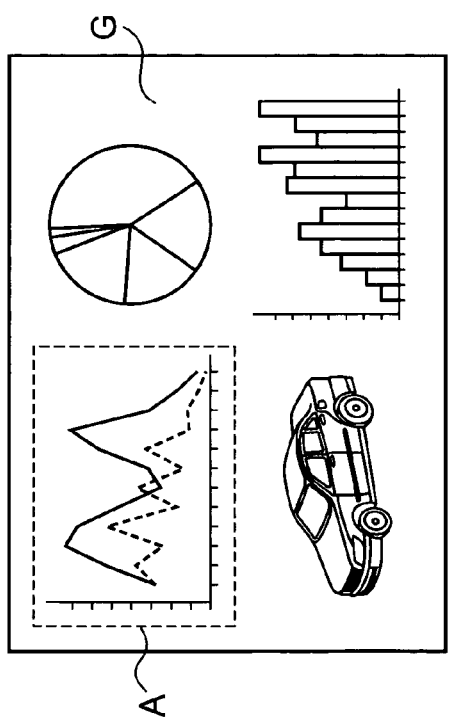
FIG. 5A shows one example of image processing for emphasizing a specific area.

Herein, the predetermined image processing for highlighting the specific area A means processing for subjecting a specific area and/or the other areas to image processing for emphasizing the specific area A. For example, as shown in FIG. 5A, the specific area A may be emphasized by blurring images in the area other than the specific area A. Alternatively, as shown in FIG. 5B, the specific area A may be emphasized by raising a gradation of images in the area other than the specific area A to cause spotting of white portions.

Figure 5C:
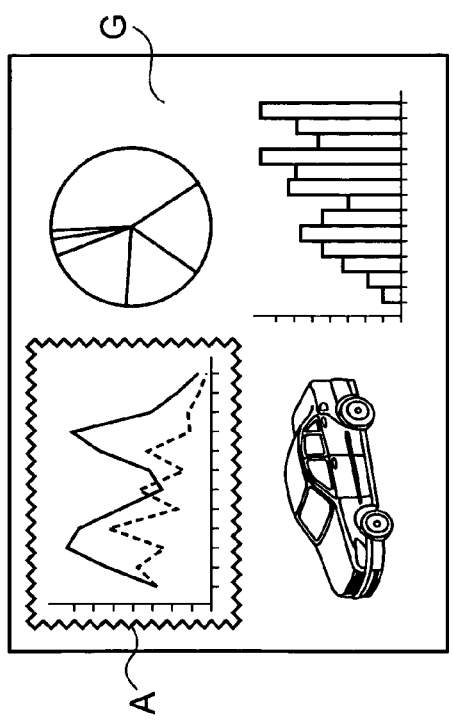
FIG. 5C shows one example of image processing for emphasizing a specific area.

Further, as shown in FIG. 5C, the specific area A may be emphasized by synthesizing an illustration image that decorates a periphery of the specific area A. As shown in FIG. 5D, the specific area A may be emphasized by synthesizing a hatching image to cover the area other than the specific area A. The method of highlighting the specific area A is not limited to the above-described image processing. For example, the specific area A may be emphasized by applying image processing such as a change of a luminance or a negative-positive inversion. In the present embodiment, the image processing is applied to any one of the specific area A or the other areas; however, the image processing may be applied to both of the specific area A and the other areas, or a plurality of the image processing may be applied in combination thereof.

Turning now to FIG. 4, the image signal subjected to image processing in step M12 is projected and displayed on the screen S (step M13), whereby the processing is completed.

As described above, according to the first embodiment, when attention is required to be given to the specific area within the image projected and displayed on the screen S, the specific area A within the image G is indicated through the main key 16 so that the specific area A can be highlighted. As a result, attention can be stably and clearly given to the specific area A within the image G.

Second Embodiment

Next, the second embodiment of the present invention will be described. In the second embodiment, however, description is made only for points different from the above-described first embodiment, and is omitted for the same construction as that of the first embodiment.

In the second embodiment, description is made on a flow of processing in highlighting the specific area within the image G from the information terminal C such as a PC (Personal Computer) connected to the projector apparatus 10 through the input/output connector section 19 as shown in FIG. 6.

Next, a flow of processing in highlighting the specific area A within the image G will be described with reference to a flowchart of FIG. 7. On the premise of the processing, the projector apparatus 10 projects and displays on the screen S the image G displayed on the display of the information terminal C, as shown in FIG. 6.

First, within the image G displayed on the display of the information terminal C, when the specific area A to which attention of viewers is required to be given is inputted and indicated by users through an operating section of the information terminal C, the indication signal is outputted to the controller 43 through the input/output connector section 19 (step M21).

Next, by the image processor 33 according to the control of the controller 43, predetermined image processing for highlighting the specific area A within the image G currently projected based on the indication signal received in step M21 is applied to an image signal corresponding to the image G (step M 22).

Further, the image signal subjected to image processing in step M22 is projected and displayed on the screen S (step M23), whereby the processing is completed.

As described above, according to the second embodiment, when attention is required to be given to the specific area within the image G projected and displayed on the screen S, the specific area A is indicated through an external image output device connectable to the input/output connector section 19 so that the specific area A can be highlighted. As a result, attention can be stably and clearly given to the specific area A within the image G.

Third Embodiment

Next, the third embodiment of the present invention will be described. In the third embodiment, however, description is made only for points different from the above-described first embodiment, and is omitted for the same construction as that of the first embodiment.

Figure 8:
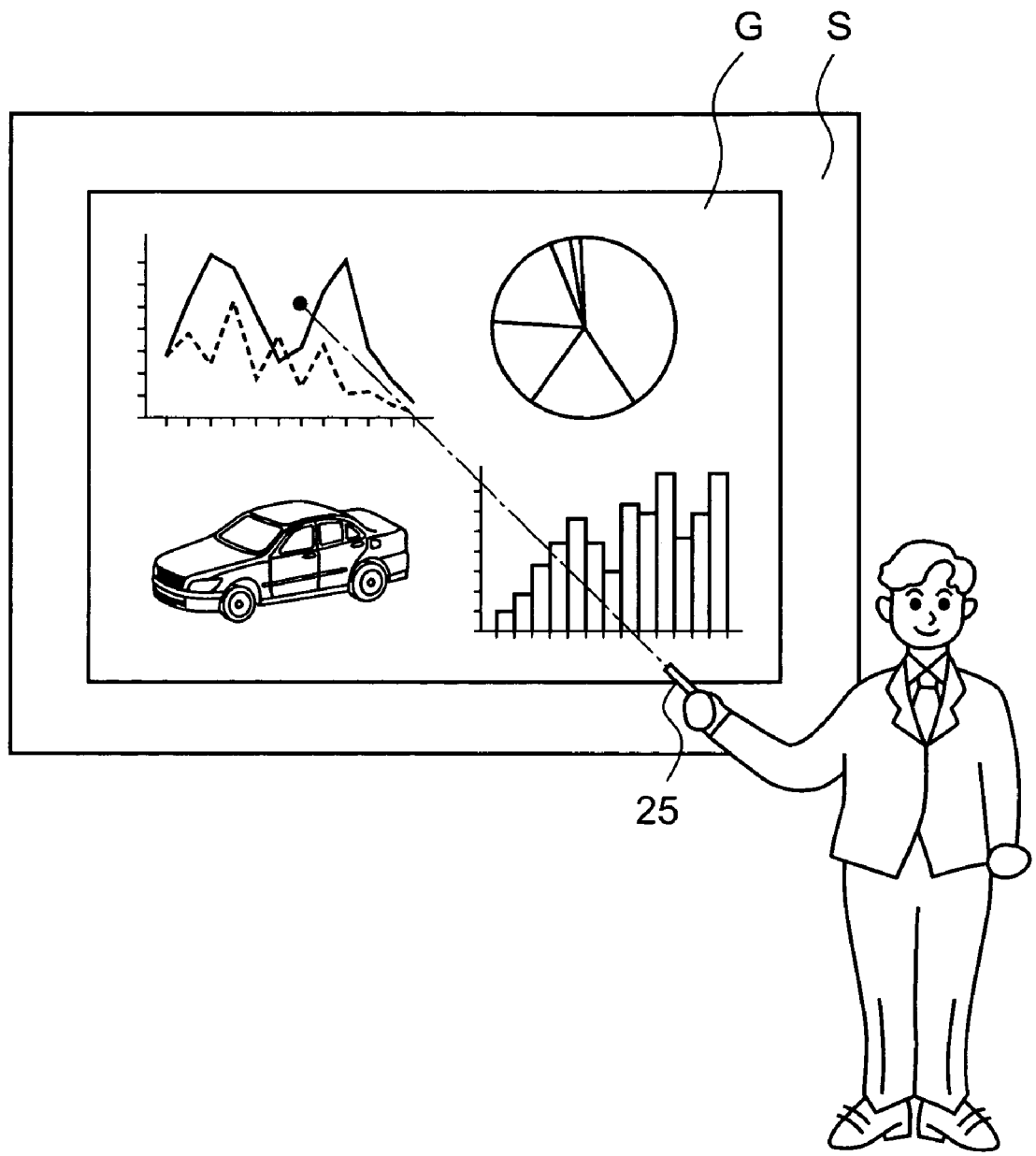
FIG. 8 shows one example of an image projected and displayed on a screen of a projector apparatus according to the third embodiment.

In the third embodiment, description is made on a flow of processing where in the image G projected and displayed on the screen S by the projector apparatus 10, an area to which attention is required to be given using an indicating tool 25 such as a laser pointer is indicated to highlight the specific area A within the image G, as shown in FIG. 8.

First, a functional construction of the projector apparatus 10 according to the third embodiment will be described with reference to FIG. 2. The projector apparatus 10 according to the third embodiment further comprises an image analysis section 48 in addition to the construction of the first embodiment.

The image analysis section 48 detects, from an image signal outputted from the processing circuit 41, position information of a point indicated using the indicating tool 25 such as a laser pointer in the image G projected and displayed on the screen S. Then, the section 48 determines the specific area A within the image G based on the detected position information. Further, the section 48 outputs information such as coordinates representing the determined specific area A to the controller 43.

Herein, operations in determining the specific area A from the position information of the point indicated using the indicating tool 25 will be described with reference to FIG. 9. Herein, each point and each line segment in the figure mean a point and a locus of the point indicated using the indicating tool 25.

Figure 9A:
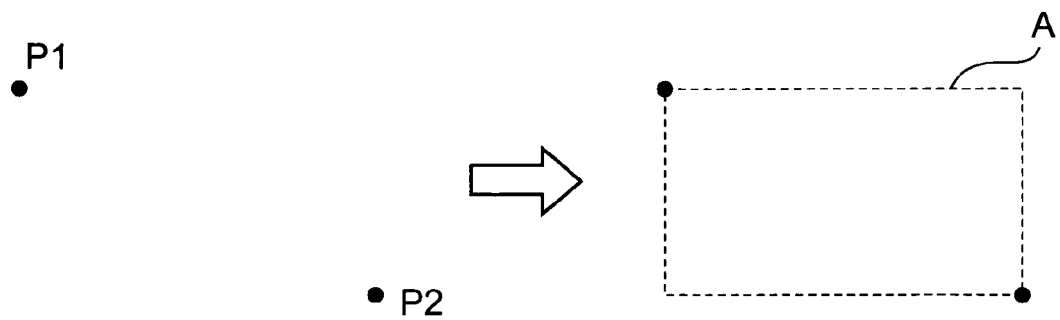
FIG. 9A shows one example of a specific area A determined based on position information of points indicated by an indicating tool.

In the image G projected and displayed on the screen S, first, when two points P1 and P2 are indicated using the indicating tool 25 as shown in FIG. 9A, the image analysis section 48 detects, from the image signal outputted from the processing circuit 41, the position information of the points P1 and P2 in the image G. Then, the section 48 determines as the specific area A an oblong area having as its diagonal a line segment between the point P1 and the point P2. A method of determining the specific area A is not limited thereto. For example, an oblong area having as one side a line segment between the point P1 and the point P2 may be determined as the specific area A. Further, the number of points indicated using the indicating tool 25 is no particular object, and a shape of the specific area A is not limited to an oblong shape.

Figure 9B:
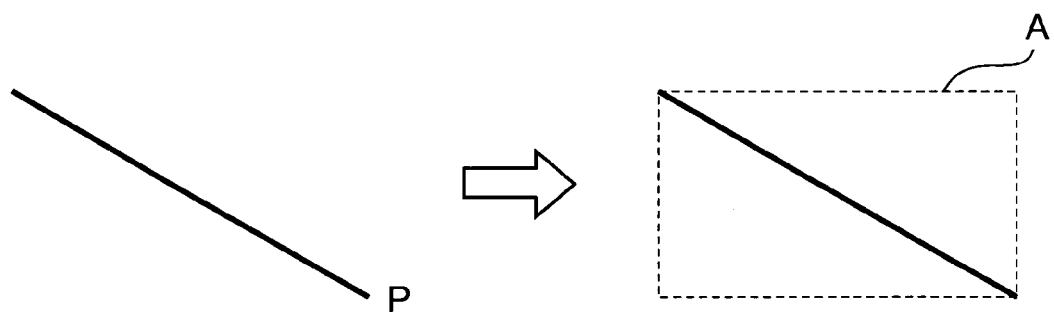
FIG. 9B shows one example of a specific area A determined based on position information of points indicated by an indicating tool.

Next, when moving the point P to indicate a line segment locus as shown in FIG. 9B, the image analysis section 48 detects, from the image signal outputted from the processing circuit 41, the position information of a locus of the point P in the image G. Then, the section 48 determines as the specific area A an oblong area having the locus as its diagonal. A method of determining the specific area A is not limited thereto. For example, an oblong area having a line segment as one side may be determined as the specific area A.

Figure 9C:
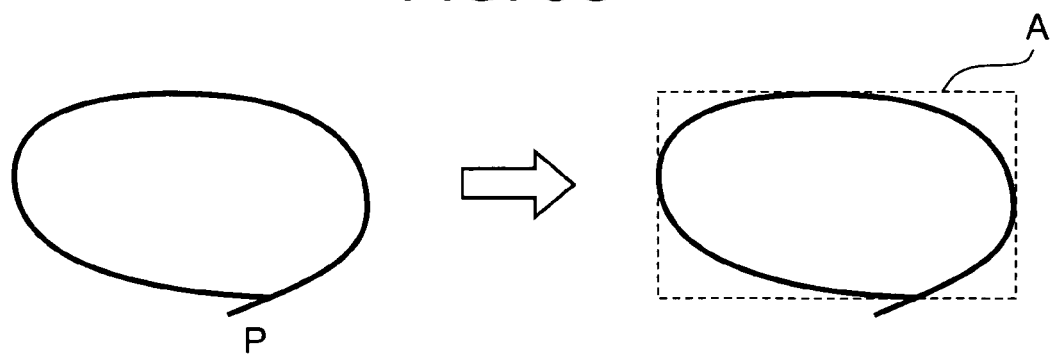
FIG. 9C shows one example of a specific area A determined based on position information of points indicated by an indicating tool.

Further, when moving the point P to indicate a line segment locus with a closed compartment as shown in FIG. 9C, the image analysis section 48 detects, from the image signal outputted from the processing circuit 41, the position information of the closed compartment indicated by the locus of the point P in the image G. Then, the section 48 determines as the specific area A an oblong area externally touching the closed compartment. A method of determining the specific area A is not limited thereto. For example, an oblong area internally touching the closed compartment may be determined as the specific area A, or the closed compartment itself may be determined as the specific area A.

Next, a flow of processing in highlighting the specific area A within the image G projected and displayed by the projector apparatus 10 will be described with reference to a flowchart of FIG. 10. On the premise of the processing, the image G is projected and displayed on the screen S by the projector apparatus 10 and a laser pointer is used as the indicating tool 25 as shown in FIG. 8.

First, the image G projected and displayed on the screen S is taken using the photographing lens 13 (step M31). In this state, when an area to which attention is required to be given using a laser pointer is indicated on the image G projected and displayed on the screen S, the specific area A is determined by the image analysis section 48 from the indicated position information (step M32).

Next, by the image processor 33 according to the control of the controller 43, predetermined image processing for highlighting the specific area A within the image G determined in step 32 is applied to an image signal corresponding to the image G (step M33).

Further, the image signal subjected to image processing in step M33 is projected and displayed on the screen S (step M34), whereby the processing is completed.

As described above, according to the third embodiment, when attention is required to be given to the specific area within the image G projected and displayed on the screen S, the specific area is indicated using the predetermined indicating tool 25. Based on the indicated position information, the specific area A within the image is determined so that the specific area A can be highlighted. As a result, attention can be stably and clearly given to the specific area A within the image G.

In the above embodiment, one example of the projector apparatus according to the present invention is described. However, the present invention is not limited thereto. Detail constructions and detail operations of the projector apparatus 10 in the above embodiment can be suitably changed within a scope not departing from the purpose of the present invention.

What is claimed is:

1. A projector apparatus for projecting and displaying an image on a screen, comprising:
    an input section which accepts an indication of a specific area within the projected and displayed image; and
    an image processor which subjects only another area within the image to image processing to give attention to the specific area the another area being an area other than the specific area in the image.

2. The projector apparatus as claimed in claim 1, wherein the image processor performs image processing for blurring an image of only the another area other than the specific area within the image to give attention to the specific area.

3. The projector apparatus as claimed in claim 1, wherein the image processor performs image processing for causing spotting of white portions by raising a gradation of picture elements of only the another area other than the specific area within the image to give attention to the specific area.

4. The projector apparatus as claimed in claim 1, wherein the image processor performs image processing for covering the another area by synthesizing a predetermined image to picture elements of only the another area other than the specific area within the image to give attention to the specific area.

5. The projector apparatus as claimed in claim 1, wherein the input section comprises:
    a connecting section which connects to an external image output device; and
    a receiver which receives area indication information indicating the specific area within the image input from the external image output device through the connecting section.

6. A projector apparatus for projecting and displaying an image on a screen, comprising:

a photographing section which photographs the image projected and displayed on the screen;

an area specifying section which determines a specific area within the image from position information of a point indicatable using an indicating tool on the image projected and displayed on the screen; and an image processor that subjects only another area within the image to image processing to give attention to the specific area the another area being an area other than the specific area in the image.

7. The projector apparatus as claimed in claim 6, wherein the area specifying section determines the specific area from position information of at least two points indicatable using the indicating tool.

8. The projector apparatus as claimed in claim 6, wherein the area specifying section determines the specific area from position information of a locus of the point indicatable using the indicating tool.

9. A display output method of a projector apparatus for projecting and displaying an image on a screen, comprising:

accepting an indication of a specific area within the projected and displayed image; and subjecting only another area within the image to image processing to give attention to specific area, the another area being an area other than the specific area in the image.

10. The display output method as claimed in claim 9, further comprising receiving area indication information indicating the specific area within the image input from an external image output device.

11. A display output method of a projector apparatus for projecting and displaying an image on a screen, comprising:

taking a photograph of the image projected and displayed on the screen;

determining a specific area within the image based on position information of a point indicatable using an indicating tool on the image projected and displayed on the screen; and subjecting only another area within the image to image processing to give attention to the specific area, the another area being an area other than the specific area in the image.

12. A computer readable medium having stored thereon a display output program for a computer which controls a projector apparatus used for projecting and displaying an image on a screen, the program controlling the computer to perform functions comprising:

accepting an indication of a specific area within the projected and displayed image; and subjecting only another area within the image to image processing to give attention to the specific area, the another area being an area other than the specific area in the image.

13. The computer readable medium as claimed in claim 12, wherein the program further controls the computer to receive area indication information indicating the specific area within the image input from an external image output device.

14. A computer readable medium having stored thereon a display output program for a computer which controls a projector apparatus used for projecting and displaying an image on a screen, the program controlling the computer to perform functions comprising:

taking a photograph of the image projected and displayed on the screen;

determining a specific area within the image based on position information of a point indicatable using an indicating tool on the image projected and displayed on the screen; and subjecting only another area within the image to image processing to give attention to the specific area, the another area being an area other than the specific area in the image.

* * * * *